US010471417B2

(12) United States Patent
Hirose et al.

(10) Patent No.: US 10,471,417 B2
(45) **Date of Patent: *Nov. 12, 2019**

(54) TITANIUM OXIDE PARTICLE AND METHOD FOR PRODUCING THE SAME

(71) Applicant: FUJI XEROX CO., LTD., Tokyo (JP)

(72) Inventors: Hidekazu Hirose, Kanagawa (JP); Hideaki Yoshikawa, Kanagawa (JP); Hiroyoshi Okuno, Kanagawa (JP); Takeshi Iwanaga, Kanagawa (JP); Yasunobu Kashima, Kanagawa (JP); Wataru Yamada, Kanagawa (JP); Sakae Takeuchi, Kanagawa (JP); Atsushi Sugitate, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/208,278

(22) Filed: Jul. 12, 2016

(65) Prior Publication Data

US 2017/0252736 A1 Sep. 7, 2017

(30) Foreign Application Priority Data

Mar. 4, 2016 (JP) ................................ 2016-042629

(51) Int. Cl.

| | |
|---|---|
| ***B01J 31/38*** | (2006.01) |
| ***B01J 21/06*** | (2006.01) |
| ***B01J 31/12*** | (2006.01) |
| ***B01J 35/00*** | (2006.01) |
| ***B01J 35/02*** | (2006.01) |
| ***B01J 37/02*** | (2006.01) |
| ***B01J 37/08*** | (2006.01) |
| ***B01J 31/02*** | (2006.01) |
| ***B01J 31/06*** | (2006.01) |

(52) U.S. Cl.

CPC ............ *B01J 31/38* (2013.01); *B01J 21/063* (2013.01); *B01J 31/0274* (2013.01); *B01J 31/069* (2013.01); *B01J 31/122* (2013.01); *B01J 35/004* (2013.01); *B01J 35/0006* (2013.01); *B01J 35/026* (2013.01); *B01J 37/0209* (2013.01); *B01J 37/0221* (2013.01); *B01J 37/08* (2013.01)

(58) Field of Classification Search

None

See application file for complete search history.

(56) References Cited

U.S. PATENT DOCUMENTS

| | | | | |
|---|---|---|---|---|
| 5,411,761 | A | 5/1995 | Inokuchi et al. | |
| 6,171,747 | B1 * | 1/2001 | Sugizaki | G03G 9/0823 430/110.4 |
| 2006/0009351 | A1 | 1/2006 | Iwamoto et al. | |
| 2012/0040194 | A1 * | 2/2012 | Kanai | B01J 35/004 428/447 |

FOREIGN PATENT DOCUMENTS

| | | | |
|---|---|---|---|
| CN | 102317069 | A | 1/2012 |
| JP | H05-221640 | A | 8/1993 |
| JP | H10-001621 | A | 1/1998 |
| JP | 2001-081394 | A | 3/2001 |
| JP | 2001-269573 | A | 10/2001 |
| JP | 2004-115541 | A | 4/2004 |
| JP | 2006-021112 | A | 1/2006 |
| JP | 2006-116462 | A | 5/2006 |
| JP | 2007-016111 | A | 1/2007 |
| JP | 2008-212841 | A | 9/2008 |
| JP | 2010-006629 | A | 1/2010 |
| JP | 2013-249229 | A | 12/2013 |
| JP | 2014-128768 | A | 7/2014 |
| JP | 2014-188417 | A | 10/2014 |

OTHER PUBLICATIONS

Apr. 20, 2017 Office Action issued in U.S. Appl. No. 15/212,021.
U.S. Appl. No. 15/212,021, filed Jul. 15, 2016 in the name of Yoshikawa et al.
Jun. 20, 2017 Office Action issued in Japanese Patent Application No. 2017-041021.
Jun. 20, 2017 Office Action issued in Japanese Patent Application No. 2017-041024.
Oct. 25, 2017 Office Action Issued in U.S. Appl. No. 15/212,021.
Mar. 8, 2018 Office Action issued in U.S. Appl. No. 15/212,021.
Aug. 13, 2018 Office Action issued in U.S. Appl. No. 15/212,021.
May 15, 2019 Office Action issued in Chinese Patent Application No. 201610681883.6.
May 15, 2019 Office Action issued in Chinese Patent Application No. 201610803424.0.
Apr. 29, 2019 Office Action issued in U.S. Appl. No. 15/212,021.
Aug. 20, 2019 Office Action issued in U.S. Appl. No. 15/212,021.

* cited by examiner

*Primary Examiner* — Yun Qian
(74) *Attorney, Agent, or Firm* — Oliff PLC

(57) ABSTRACT

A titanium oxide particle surface-treated with a silane compound having a hydrocarbon group has absorption at a wavelength of about 400 nm or more and about 800 nm or less in an ultraviolet-visible absorption spectrum, and has an absorption peak at a wave number of about 2700 $cm^{-1}$ or more and about 3000 $cm^{-1}$ or less in an infrared absorption spectrum.

19 Claims, No Drawings

TITANIUM OXIDE PARTICLE AND METHOD FOR PRODUCING THE SAME

CROSS-REFERENCE TO RELATED APPLICATIONS

This application is based on and claims priority under 35 USC 119 from Japanese Patent Application No. 2016-042629 filed Mar. 4, 2016.

BACKGROUND

Technical Field

The present invention relates to a titanium oxide particle and a method for producing the titanium oxide particle.

SUMMARY

According to an aspect of the invention, there is provided a titanium oxide particle surface-treated with a silane compound having a hydrocarbon group, wherein the titanium oxide particle has absorption at a wavelength of about 400 nm or more and about 800 nm or less in an ultraviolet-visible absorption spectrum, and the titanium oxide particle has an absorption peak at a wave number of about 2700 $cm^{-1}$ or more and about 3000 $cm^{-1}$ or less in an infrared absorption spectrum.

DETAILED DESCRIPTION

Hereafter, an exemplary embodiment according to the present invention will be described.

Titanium Oxide Particles

Titanium oxide particles according to this exemplary embodiment are surface-treated with a silane compound having a hydrocarbon group.

The titanium oxide particles have absorption at a wavelength of 400 nm or about 400 nm or more and 800 nm or about 800 nm or less in an ultraviolet-visible absorption spectrum and an absorption peak at a wave number of 2700 $cm^{-1}$ or about 2700 $cm^{-1}$ or more and 3000 $cm^{-1}$ or about 3000 $cm^{-1}$ or less in an infrared absorption spectrum.

Therefore, the titanium oxide particles according to this exemplary embodiment exhibit a good photocatalytic function in the visible range. The reason for this is believed to be as follows.

Titanium oxide particles untreated as a photocatalyst normally exhibit a photocatalytic function (photocatalysis) through absorption of ultraviolet light. Therefore, untreated titanium oxide particles are capable of exhibiting a photocatalytic function during daytime on a sunny day in which a sufficient dose is provided. However, untreated titanium oxide particles hardly exhibit a sufficient photocatalytic function at night or in the shade. For example, when untreated titanium oxide particles are used for a material for exterior walls, there is a difference in antifouling properties between the sunny place and the shade in many cases. Furthermore, when untreated titanium oxide particles are used in an air cleaner, a water purifier, or the like, some space is required inside an apparatus (e.g., installation of a black light serving as a light source for ultraviolet rays), which tends to increase the cost more than necessary.

Titanium oxide particles that exhibit a photocatalytic function (photocatalysis) through absorption of visible light have been known in recent years. Examples of such visible light-absorbing titanium oxide particles include titanium oxide particles obtained by carrying dissimilar metals (e.g., iron, copper, and tungsten) onto titanium oxide and titanium oxide particles doped with nitrogen, sulfur, or the like.

However, the photocatalytic function through absorption of visible light is still not sufficient, and thus there has been an increasing demand for titanium oxide particles that exhibit a good photocatalytic function in the visible range.

To achieve this, there are provided titanium oxide particles that are surface-treated with a silane compound having a hydrocarbon group, have absorption at a wavelength of 400 nm or about 400 nm or more and 800 nm or about 800 nm or less in an ultraviolet-visible absorption spectrum, and have an absorption peak at a wave number of 2700 $cm^{-1}$ or about 2700 $cm^{-1}$ or more and 3000 $cm^{-1}$ or about 3000 $cm^{-1}$ or less in an infrared absorption spectrum.

In the titanium oxide particles having an absorption peak at a wave number of 2700 $cm^{-1}$ or about 2700 $cm^{-1}$ or more and 3000 $cm^{-1}$ or about 3000 $cm^{-1}$ or less in an infrared absorption spectrum, it is believed that a hydrocarbon and carbon obtained as a result of carbonization of the hydrocarbon are present inside pores of the titanium oxide particles, that is, a hydrocarbon and carbon obtained as a result of carbonization of the hydrocarbon are incorporated into a portion from the surface layer to inside of the titanium oxide particles.

The incorporated carbon is believed to function as a charge separation substance, and a photocatalytic function is exhibited. The carbon also exhibits a photocharge separation function through absorption of visible light together with ultraviolet light, and a photocatalytic function is exhibited. This shows that titanium oxide particles have absorption at a wavelength of 400 nm or about 400 nm or more and 800 nm or about 800 nm or less in an ultraviolet-visible absorption spectrum. Furthermore, the carbon serving as a charge separation substance also has a function of facilitating the separation of charges generated as a result of light absorption and thus functions as a promoter.

In other words, the carbon present inside pores of titanium oxide particles has a function of selectively trapping electrons through absorption of visible light together with ultraviolet light. Thus, the carbon serving as a charge separation substance decreases probability that electrons and holes generated through light absorption are recombined with each other. This efficiently facilitates the separation of charges, which improves the photocatalytic function.

Accordingly, the titanium oxide particles having the above features according to this exemplary embodiment are believed to exhibit a good photocatalytic function in the visible range.

In general, untreated titanium oxide particles have a low degree of freedom in terms of controlling the particle size, the particle size distribution, and the particle shape and tend to be highly aggregated. Therefore, such untreated titanium oxide particles have poor dispersibility in a resin or liquid, which poses the following problems: 1) the photocatalytic function is not easily exhibited and 2) the transparency of films and the like and the uniformity of coating films of coating liquids tend to degrade.

In contrast, the titanium oxide particles according to this exemplary embodiment have good dispersibility because a hydrocarbon group derived from a silane compound is present on the surfaces of the titanium oxide particles. Therefore, a substantially uniform film is formed and light is efficiently incident on the titanium oxide particles, and thus the photocatalytic function is easily exhibited. Furthermore, the transparency of films and the like and the uniformity of coating films of coating liquids are improved, and the design is maintained. Consequently, for example, when a paint containing the titanium oxide particles is applied onto surfaces of materials for exterior walls, boards, pipes, and nonwoven fabrics (nonwoven fabrics made of a ceramic or the like), the aggregation of titanium oxide particles and the coating defects are suppressed. Thus, the photocatalytic function is easily exhibited for a long time.

Hereafter, the titanium oxide particles according to this exemplary embodiment will be described in detail.

Untreated Titanium Oxide Particles

Untreated titanium oxide particles (titanium oxide particles to be surface-treated) are, for example, particles of brookite, anatase, or rutile titanium oxide. The titanium oxide particles may have a single crystal structure of brookite, anatase, or rutile or may have a mixed crystal structure in which such crystals coexist.

The untreated titanium oxide particles may be produced by any method such as a chlorine method (gas-phase method) or a sulfuric acid method (liquid-phase method).

An example of the chlorine method (gas-phase method) is as follows. First, rutile ore serving as a raw material is reacted with coke and chlorine to form gaseous titanium tetrachloride. Then, the gaseous titanium tetrachloride is cooled to form liquid titanium tetrachloride. Subsequently, the liquid titanium tetrachloride is reacted with oxygen at high temperatures, and then chlorine gas is separated. Thus, untreated titanium oxide is produced.

An example of the sulfuric acid method (liquid-phase method) is as follows. First, ilmenite ore ($FeTiO_3$) or titanium slag serving as a raw material is dissolved in a concentrated sulfuric acid. An iron component, which is an impurity, is removed in the form of iron sulfate ($FeSO_4$) to form titanium oxysulfate ($TiOSO_4$). Then, the titanium oxysulfate ($TiOSO_4$) is hydrolyzed and titanium oxyhydroxide ($TiO(OH)_2$) is precipitated. Subsequently, the precipitate is washed and dried. The dried product is fired to produce untreated titanium oxide.

The untreated titanium oxide particles may also be produced by a sol-gel method that uses titanium alkoxide or a method in which metatitanic acid is fired. Since the crystal structure of titanium oxide particles changes to brookite, anatase, and rutile in accordance with the firing temperature (e.g., heating in the range of 400° C. to 1200° C.), untreated titanium oxide particles having a desired crystal structure are produced by controlling the firing temperature.

Silane Compound

A silane compound has a hydrocarbon group. The hydrocarbon group of the silane compound is, for example, a saturated or unsaturated aliphatic hydrocarbon group having 1 to 20 carbon atoms (preferably 1 to 18 carbon atoms, more preferably 4 to 12 carbon atoms, and further preferably 4 to 10 carbon atoms) or an aromatic hydrocarbon group.

Examples of the silane compound include chlorosilane compounds, alkoxysilane compounds, and silazane compounds (e.g., hexamethyldisilazane).

Among them, the silane compound is particularly a compound represented by general formula $R^1_nSiR^2_m$ from the viewpoint of good photocatalytic function and improvement in dispersibility.

In the general formula $R^1_nSiR^2_m$, $R^1$ represents a saturated or unsaturated aliphatic hydrocarbon group having 1 to 20 carbon atoms or an aromatic hydrocarbon group, $R^2$ represents a halogen atom or an alkoxy group, n represents an integer of 1 to 3, and m represents an integer of 1 to 3, where n+m=4. When n represents an integer of 2 or 3, multiple $R^1$ may represent the same group or different groups. When m represents an integer of 2 or 3, multiple $R^2$ may represent the same group or different groups.

The aliphatic hydrocarbon group represented by $R^1$ may be a linear, branched, or cyclic hydrocarbon group. From the viewpoint of dispersibility, a linear or branched hydrocarbon group is preferred and a linear hydrocarbon group is further preferred. The number of carbon atoms in the aliphatic hydrocarbon group is preferably 1 to 18, more preferably 4 to 12, and further preferably 4 to 10 from the viewpoint of good photocatalytic function and improvement in dispersibility. The aliphatic hydrocarbon group may be a saturated or unsaturated aliphatic hydrocarbon group, but a saturated aliphatic hydrocarbon group is preferred from the viewpoint of good photocatalytic function and improvement in dispersibility.

Examples of the saturated aliphatic hydrocarbon group include linear alkyl groups (e.g., methyl group, ethyl group, propyl group, butyl group, pentyl group, hexyl group, heptyl group, octyl group, nonyl group, decyl group, dodecyl group, hexadecyl group, and icosyl group), branched alkyl groups (e.g., isopropyl group, isobutyl group, isopentyl group, neopentyl group, 2-ethylhexyl group, tertiary butyl group, and tertiary pentyl group), and cyclic alkyl groups (e.g., cyclopropyl group, cyclopentyl group, cyclohexyl group, cycloheptyl group, cyclooctyl group, tricyclodecyl group, norbornyl group, and adamantyl group).

Examples of the unsaturated aliphatic hydrocarbon group include alkenyl groups (e.g., vinyl group (ethenyl group), 1-propenyl group, 2-propenyl group, 2-butenyl group, 1-butenyl group, 1-hexenyl group, 2-dodecenyl group, and pentenyl group) and alkynyl groups (e.g., ethynyl group, 1-propynyl group, 2-propynyl group, 1-butynyl group, 3-hexynyl group, and 2-dodecynyl group).

The aliphatic hydrocarbon group may be a substituted aliphatic hydrocarbon group. Examples of the substituent for the aliphatic hydrocarbon group include a glycidoxy group, a mercapto group, a methacryloyl group, and an acryloyl group.

The aromatic hydrocarbon group represented by $R^1$ is, for example, an aromatic hydrocarbon group having 6 to 27 carbon atoms (preferably 6 to 18 carbon atoms).

Examples of the aromatic hydrocarbon group include a phenylene group, a biphenylene group, a terphenylene group, a naphthalene group, and an anthracene group.

The aromatic hydrocarbon group may be a substituted aromatic hydrocarbon group. Examples of the substituent for the aromatic hydrocarbon group include a glycidoxy group, a mercapto group, a methacryloyl group, and an acryloyl group.

The halogen atom represented by $R^2$ is, for example, fluorine, chlorine, bromine, or iodine. Among them, the halogen atom is preferably chlorine, bromine, or iodine.

The alkoxy group represented by $R^2$ is, for example, an alkoxy group having 1 to 10 carbon atoms (preferably 1 to 8 carbon atoms and more preferably 3 to 8 carbon atoms).

Examples of the alkoxy group include a methoxy group, an ethoxy group, an isopropoxy group, a t-butoxy group, a n-butoxy group, a n-hexyloxy group, a 2-ethylhexyloxy group, and a 3,5,5-trimethylhexyloxy group.

The alkoxy group may be a substituted alkoxy group. Examples of the substituent for the alkoxy group include a halogen atom, a hydroxy group, an amino group, an alkoxy group, an amide group, and a carbonyl group.

The compound represented by the general formula $R^1_nSiR^2_m$ is preferably a compound with $R^1$ representing a saturated hydrocarbon group from the viewpoint of good photocatalytic function and improvement in dispersibility.

The compound represented by the general formula $R^1{}_nSiR^2{}_m$ is particularly preferably a compound with $R^1$ representing a saturated aliphatic hydrocarbon group having 1 to 20 carbon atoms, $R^2$ representing a halogen atom or an alkoxy group, n representing an integer of 1 to 3, and m representing an integer of 1 to 3 (n+m=4).

Specific examples of the compound represented by the general formula $R^1{}_nSiR^2{}_m$ include vinyltrimethoxysilane, propyltrimethoxysilane, i-butyltrimethoxysilane, n-butyltrimethoxysilane, n-hexyltrimethoxysilane, n-octyltrimethoxysilane, n-dodecyltriethoxysilane, phenyltrimethoxysilane, 3-glycidoxypropyltrimethoxysilane, tetramethoxysilane, methyltrimethoxysilane, dimethyldimethoxysilane, diphenyldimethoxysilane, o-methylphenyltrimethoxysilane, p-methylphenyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, and γ-(2-aminoethyl)aminopropylmethyldimethoxysilane.

The silane compounds may be used alone or in combination of two or more.

Characteristics of Titanium Oxide Particles

The titanium oxide particles according to this exemplary embodiment have absorption at a wavelength of 400 nm or about 400 nm or more and 800 nm or about 800 nm or less in an ultraviolet-visible absorption spectrum.

Specifically, when the absorbance at a wavelength of 350 nm in an ultraviolet-visible absorption spectrum is assumed to be 1, the titanium oxide particles preferably have an absorbance of 0.02 or more (preferably 0.1 or more) at a wavelength of 450 nm and more preferably have an absorbance of 0.2 or more (preferably 0.3 or more) at a wavelength of 450 nm and an absorbance of 0.02 or more (preferably 0.1 or more) at a wavelength of 750 nm from the viewpoint of good photocatalytic function in the visible range.

The ultraviolet-visible absorption spectrum is measured by the following method. Titanium oxide particles are measured using a spectrophotometer (U-4100 manufactured by Hitachi High-Technologies Corporation) [measurement conditions, scanning speed: 600 nm/min, slit width: 2 nm, sampling interval: 1 nm] in a wavelength range of 200 nm or more and 900 nm or less to obtain an ultraviolet-visible absorption spectrum. This measurement may be performed on a thin-film sample obtained by molding particles.

The titanium oxide particles according to this exemplary embodiment have an absorption peak at a wave number of 2700 $cm^{-1}$ or about 2700 $cm^{-1}$ or more and 3000 $cm^{-1}$ or about 3000 $cm^{-1}$ or less in an infrared absorption spectrum.

Specifically, the titanium oxide particles have at least one absorption peak at a wave number of 2700 $cm^{-1}$ or about 2700 $cm^{-1}$ or more and 3000 $cm^{-1}$ or about 3000 $cm^{-1}$ or less in an infrared absorption spectrum. The absorption peak indicates absorption with an absorption intensity (absorbance) of 0.022 (5% in terms of transmittance) or more.

The infrared absorption spectrum is measured by the following method. First, titanium oxide particles to be measured undergo a KBr pellet method to prepare a measurement sample. Then, the measurement sample is measured using an infrared spectrophotometer (FT-IR-410 manufactured by JASCO Corporation) in a wave number range of 500 $cm^{-1}$ or more and 4000 $cm^{-1}$ or less under conditions of number of runs: 300 and resolution: 4 $cm^{-1}$ to obtain an infrared absorption spectrum.

The volume-average particle size of the titanium oxide particles according to this exemplary embodiment is preferably 10 nm or about 10 nm or more and 1 μm or about 1 μm or less and more preferably 15 nm or about 15 nm or more and 200 nm or about 200 nm or less.

When the volume-average particle size of the titanium oxide particles is 10 nm or about 10 nm or more, the titanium oxide particles are not easily aggregated, which may readily improve the photocatalytic function. When the volume-average particle size of the titanium oxide particles is 1 μm or about 1 μm or less, the ratio of specific surface to volume increases, which may readily improve the photocatalytic function. Therefore, when the volume-average particle size of the titanium oxide particles is within the above range, a good photocatalytic function is easily exhibited in the visible range.

The volume-average particle size of the titanium oxide particles is measured using a Nanotrac UPA-ST (dynamic light scattering particle size analyzer manufactured by MicrotracBEL Corp.) under measurement conditions of sample concentration: 20% and measurement time: 300 seconds. This analyzer measures a particle size using Brownian movement of a dispersoid. The particle size is measured by applying laser beams to a solution and detecting the scattered light.

The particle size distribution measured by the dynamic light scattering particle size analyzer is divided into particle size sections (channels). Cumulative volume distribution of the particles is drawn from smaller particle sizes. The particle size at which the cumulative volume is 50% is defined as a volume-average particle size.

Method for Producing Titanium Oxide Particles

A method for producing titanium oxide particles according to this exemplary embodiment includes surface-treating untreated titanium oxide particles with a silane compound having a hydrocarbon group.

The titanium oxide particles are heated at 180° C. or about 180° C. or higher and 500° C. or about 500° C. or lower while or after the untreated titanium oxide particles are surface-treated.

In the method for producing titanium oxide particles according to this exemplary embodiment, titanium oxide particles (i.e., the titanium oxide particles according to this exemplary embodiment) that exhibit a good photocatalytic function in the visible range are produced through the above process. The reason for this is believed be as follows.

In the case where the titanium oxide particles are heated at 180° C. or about 180° C. or higher and 500° C. or about 500° C. or lower while or after the untreated titanium oxide particles are surface-treated with the silane compound, a hydrocarbon group in the reacted silane compound is separated and brought onto the surfaces of the titanium oxide particles to a certain degree. A part of the separated hydrocarbon group is carbonized, and a hydrocarbon and carbon obtained as a result of carbonization of the hydrocarbon are incorporated into pores of the titanium oxide particles. As described above, the incorporated carbon absorbs visible light together with ultraviolet light and functions as a charge separation substance and a promoter.

In the method for producing titanium oxide particles according to this exemplary embodiment, therefore, the titanium oxide particles (i.e., the titanium oxide particles according to this exemplary embodiment) that exhibit a good photocatalytic function in the visible range are believed to be produced.

In the method for producing titanium oxide particles according to this exemplary embodiment, the hydrocarbon group in the reacted silane compound is left on the surfaces of the titanium oxide particles to a certain degree through the heat treatment at 180° C. or about 180° C. or higher and 500° C. or about 500° C. or lower. Therefore, the dispersibility is achieved by the hydrocarbon group.

Hereafter, the method for producing titanium oxide particles according to this exemplary embodiment will be described in detail.

The surface treatment of the untreated titanium oxide particles with the silane compound will be described.

Non-limiting examples of the method for surface-treating the untreated titanium oxide particles with the silane compound include a method in which the silane compound itself is directly brought into contact with the untreated titanium oxide particles and a method in which a treatment solution prepared by dissolving the silane compound in a solvent is brought into contact with the untreated titanium oxide particles. Specific examples of the method include a method in which the silane compound itself or the treatment solution is added under stirring to a dispersion liquid prepared by dispersing the untreated titanium oxide particles in a solvent and a method in which the silane compound itself or the treatment solution is added (e.g., added dropwise or sprayed) to untreated titanium oxide particles being stirred with a Henschel mixer or the like.

By performing the above method, a reactive group (e.g., hydrolyzable group) in the silane compound reacts with a hydrolyzable group (e.g., hydroxy group, halogen group, or alkoxy group) or the like present on the surfaces of the untreated titanium oxide particles. Thus, the untreated titanium oxide particles are surface-treated with the silane compound.

Examples of the solvent in which the silane compound is dissolved include organic solvents (e.g., hydrocarbon solvent, ester solvent, ether solvent, halogen-based solvent, and alcohol solvent), water, and mixed solvents of the foregoing.

Examples of the hydrocarbon solvent include toluene, benzene, xylene, hexane, octane, hexadecane, and cyclohexane. Examples of the ester solvent include methyl acetate, ethyl acetate, isopropyl acetate, and amyl acetate. Examples of the ether solvent include dibutyl ether and dibenzyl ether. Examples of the halogen-based solvent include 1,1-dichloro-1-fluoroethane, 1,1-dichloro-2,2,2-trifluoroethane, 1,1-dichloro-2,2,3,3,3-pentafluoropropane, chloroform, dichloroethane, and carbon tetrachloride. Examples of the alcohol solvent include methanol, ethanol, and i-propyl alcohol. Examples of the water include tap water, distilled water, and pure water.

Instead of the above solvents, a solvent such as dimethylformamide, dimethylacetamide, dimethyl sulfoxide, acetic acid, or sulfuric acid may also be used.

In the treatment solution prepared by dissolving the silane compound in a solvent, the concentration of the silane compound in the solvent is preferably 0.05 mol/L or more and 500 mol/L or less and more preferably 0.5 mol/L or more and 10 mol/L or less.

From the viewpoint of good photocatalytic function and improvement in dispersibility, the untreated titanium oxide particles are surface-treated with the silane compound under the following conditions. The amount of the silane compound used for the surface treatment of the untreated titanium oxide particles may be 10 mass % or about 10 mass % or more and 100 mass % or about 100 mass % or less (preferably 20 mass % or more and 75 mass % or less and more preferably 25 mass % or more and 75 mass % or less) relative to the untreated titanium oxide particles. When the amount of the silane compound used for the surface treatment is 10 mass % or about 10 mass % or more, a good photocatalytic function may be easily exhibited in the visible range and the dispersibility may also be easily improved. When the amount of the silane compound used for the surface treatment is 100 mass % or about 100 mass % or less, an excessive increase in the amount of silicon (Si) on the surfaces (Ti—O—) of the titanium oxide particles may be suppressed, which tends to suppress the degradation of the photocatalytic function due to an excess amount of silicon (Si).

The temperature at which the untreated titanium oxide particles are surface-treated with the silane compound is preferably 15° C. or higher and 150° C. or lower and more preferably 20° C. or higher and 100° C. or lower. The surface treatment time is preferably 10 minutes or longer and 120 minutes or shorter and more preferably 30 minutes or longer and 90 minutes or shorter.

After the untreated titanium oxide particles are surface-treated with the silane compound, a drying treatment may be performed. The drying treatment may be performed by any known drying method such as a vacuum drying method or a spray drying method. The drying temperature may be 20° C. or higher and 150° C. or lower.

Next, the heat treatment at 180° C. or about 180° C. or higher and 500° C. or about 500° C. or lower (hereafter also referred to as a "particular heat treatment") will be described.

The particular heat treatment is performed while or after the untreated titanium oxide particles are surface-treated. Specifically, the particular heat treatment is performed when the untreated titanium oxide particles are surface-treated with the silane compound, when the drying treatment after the surface treatment is performed, or after the drying treatment.

In the case where the particular heat treatment is performed when the untreated titanium oxide particles are surface-treated with the silane compound, the heat treatment is performed at a temperature of 180° C. or about 180° C. or higher and 500° C. or about 500° C. or lower as a surface treatment temperature. In the case where the particular heat treatment is performed when the drying treatment after the surface treatment is performed, the heat treatment is performed at 180° C. or about 180° C. or higher and 500° C. or about 500° C. or lower as a drying temperature.

The temperature in the particular heat treatment is 180° C. or about 180° C. or higher and 500° C. or about 500° C. or lower. From the viewpoint of good photocatalytic function and improvement in dispersibility, the temperature is preferably 200° C. or higher and 450° C. or lower and more preferably 250° C. or higher and 400° C. or lower.

The time for the particular heat treatment is preferably 10 minutes or longer and 300 minutes or shorter and more preferably 30 minutes or longer and 120 minutes or shorter from the viewpoint of good photocatalytic function and improvement in dispersibility.

The particular heat treatment may be performed by any known method that uses, for example, an electric furnace, a firing furnace (e.g., roller-hearth kiln and shuttle kiln), or a radiant heating furnace.

Through the above processes, the titanium oxide particles according to this exemplary embodiment are produced.

EXAMPLES

Hereafter, the present invention will be further specifically described based on Examples. Examples do not limit the present invention. Note that "part" and "%" are on a mass basis unless otherwise specified.

Example 1

A dispersion liquid is prepared by dispersing commercially available anatase titanium oxide particles ("SSP-20 (manufactured by SAKAI CHEMICAL INDUSTRY Co., Ltd.)", volume-average particle size: 12 nm) in methanol. To this dispersion liquid, 35 mass % of hexyltrimethoxysilane relative to untreated titanium oxide particles is added dropwise, and a reaction is caused to proceed at 40° C. for 1 hour. Then, spray drying is performed at an outlet temperature of 120° C. to obtain a dried powder. The dried powder is heat-treated in an electric furnace at 400° C. for 1 hour to obtain titanium oxide particles 1.

Example 2

Titanium oxide particles 2 are obtained in the same manner as in Example 1, except that the anatase titanium oxide particles are changed to rutile titanium oxide particles ("STR-100N (manufactured by SAKAI CHEMICAL INDUSTRY Co., Ltd.)", volume-average particle size: 16 nm).

Example 3

Titanium oxide particles 3 are obtained in the same manner as in Example 1, except that the anatase titanium oxide particles are changed to anatase titanium oxide particles (volume-average particle size: 120 nm) prepared by a sol-gel method.

Example 4

Titanium oxide particles 4 are obtained in the same manner as in Example 1, except that the temperature in the electric furnace at which the dried powder is heat-treated is changed from 400° C. to 190° C.

Example 5

Titanium oxide particles 5 are obtained in the same manner as in Example 1, except that the temperature in the electric furnace at which the dried powder is heat-treated is changed from 400° C. to 350° C.

Example 6

Titanium oxide particles 6 are obtained in the same manner as in Example 1, except that the temperature in the electric furnace at which the dried powder is heat-treated is changed from 400° C. to 250° C.

Example 7

Titanium oxide particles 7 are obtained in the same manner as in Example 1, except that the temperature in the electric furnace at which the dried powder is heat-treated is changed from 400° C. to 500° C.

Example 8

Titanium oxide particles 8 are obtained in the same manner as in Example 1, except that the hexyltrimethoxysilane is changed to isobutyltrimethoxysilane.

Example 9

Titanium oxide particles 9 are obtained in the same manner as in Example 1, except that the hexyltrimethoxysilane is changed to decyltrimethoxysilane.

Example 10

Titanium oxide particles 10 are obtained in the same manner as in Example 1, except that the hexyltrimethoxysilane is changed to methyltrimethoxysilane.

Example 11

Titanium oxide particles 11 are obtained in the same manner as in Example 1, except that the hexyltrimethoxysilane is changed to dodecyltrimethoxysilane.

Example 12

Titanium oxide particles 12 are obtained in the same manner as in Example 1, except that the hexyltrimethoxysilane is changed to octadecyltrimethoxysilane.

Example 13

Titanium oxide particles 13 are obtained in the same manner as in Example 1, except that the hexyltrimethoxysilane is changed to octyltrichlorosilane.

Example 14

Titanium oxide particles 14 are obtained in the same manner as in Example 1, except that the hexyltrimethoxysilane is changed to 3-phenylaminopropyltrimethoxysilane.

Example 15

Titanium oxide particles 15 are obtained in the same manner as in Example 1, except that the hexyltrimethoxysilane is changed to dimethoxy(methyl) (octyl)silane.

Example 16

Titanium oxide particles 16 are obtained in the same manner as in Example 1, except that the hexyltrimethoxysilane is changed to tri-n-hexylchlorosilane.

Example 17

Titanium oxide particles 17 are obtained in the same manner as in Example 1, except that the hexyltrimethoxysilane is changed to n-octyldimethylchlorosilane.

Example 18

Titanium oxide particles 18 are obtained in the same manner as in Example 1, except that the hexyltrimethoxysilane is changed to hexamethyldisilazane.

Example 19

Titanium oxide particles 19 are obtained in the same manner as in Example 1, except that the amount of hexyltrimethoxysilane added is changed from 35 mass % to 15 mass %.

Example 20

Titanium oxide particles 20 are obtained in the same manner as in Example 1, except that the amount of hexyltrimethoxysilane added is changed from 35 mass % to 95 mass %.

Example 21

Titanium oxide particles 21 are obtained in the same manner as in Example 1, except that the amount of hexyltrimethoxysilane added is changed from 35 mass % to 8 mass %.

Example 22

Titanium oxide particles 22 are obtained in the same manner as in Example 1, except that the amount of hexyltrimethoxysilane added is changed from 35 mass % to 110 mass %.

Example 23

Titanium oxide particles 23 are obtained in the same manner as in Example 1, except that the anatase titanium oxide particles are changed to anatase titanium oxide particles (volume-average particle size: 8 nm) prepared by a hydrochloric acid method.

Example 24

Titanium oxide particles 24 are obtained in the same manner as in Example 1, except that the anatase titanium oxide particles are changed to anatase titanium oxide particles (volume-average particle size: 1100 nm) prepared by a sulfuric acid method.

Comparative Example 1

Commercially available anatase titanium oxide particles ("SSP-20 (manufactured by SAKAI CHEMICAL INDUSTRY Co., Ltd.)", volume-average particle size: 12 nm) themselves are used as titanium oxide particles C1.

Comparative Example 2

Commercially available rutile titanium oxide particles ("STR-100N (manufactured by SAKAI CHEMICAL INDUSTRY Co., Ltd.)", volume-average particle size: 16 nm) themselves are used as titanium oxide particles C2.

Comparative Example 3

Commercially available anatase titanium oxide particles ("SSP-20 (manufactured by SAKAI CHEMICAL INDUSTRY Co., Ltd.)", volume-average particle size: 12 nm) are heat-treated in an electric furnace at 400° C. for 1 hour to obtain titanium oxide particles C3.

Comparative Example 4

Commercially available rutile titanium oxide particles ("STR-100N (manufactured by SAKAI CHEMICAL INDUSTRY Co., Ltd.)", volume-average particle size: 16 nm) are heat-treated in an electric furnace at 400° C. for 1 hour to obtain titanium oxide particles C4.

Comparative Example 5

Commercially available visible-light-responding photocatalyst dispersion liquid ("RENECAT (manufactured by TOSHIBA CORPORATION)", dispersion liquid containing tungsten oxide particles dispersed therein, volume-average particle size: 200 nm) are dried at ordinary temperature (25° C.) to obtain tungsten oxide particles C5.

Comparative Example 6

A dispersion liquid is prepared by dispersing commercially available anatase titanium oxide particles ("SSP-20 (manufactured by SAKAI CHEMICAL INDUSTRY Co., Ltd.)", volume-average particle size: 12 nm) in methanol. To this dispersion liquid, 35 mass % of hexyltrimethoxysilane relative to titanium oxide particles is added dropwise, and a reaction is caused to proceed at 40° C. for 1 hour. Then, spray drying is performed at an outlet temperature of 120° C. to obtain a dried powder. The dried powder is heat-treated in an electric furnace at 600° C. for 1 hour to obtain titanium oxide particles C6.

Comparative Example 7

Titanium oxide particles C7 are obtained in the same manner as in Comparative Example 6, except that the heat treatment temperature in the electric furnace is changed from 600° C. to 50° C.

Measurement

For the particles obtained in each of Examples and Comparative Examples, the ultraviolet-visible absorption spectrum characteristics (given as "UV-Visi characteristics" in Tables, absorbances at wavelengths of 450 nm and 750 nm obtained when the absorbance at a wavelength of 350 nm is assumed to be 1), the infrared absorption spectrum characteristics (given as "IR characteristics" in Tables, presence or absence of an absorption peak in a wave number range of 2700 $cm^{-1}$ or more and 3000 $cm^{-1}$ or less, and the wave number at which the absorption peak appears), and the volume-average particle size (given as "D50v" in Tables) are measured by the above-described methods.

Evaluation

Degradability

Degradability is evaluated as photocatalytic characteristics in the visible range. The degradability is evaluated on the basis of the degradability (transmittance change) of methylene blue. Specifically, 30 mL of a diluted methylene blue solution prepared so as to have a methylene blue concentration of 20 ppm (mass basis) and the particles obtained in each of Examples and Comparative Examples are inserted into a beaker to prepare two samples.

With a light-emitting diode (LED) that emits visible light with a wavelength of 400 nm or more and 550 nm or less, which is outside the absorption wavelength range (550 nm or more and 800 nm or less) of methylene blue, the visible light is continuously applied to one sample just after the preparation for 7 hours. The other sample just after the preparation is stored in a dark place for 7 hours.

The transmittances (concentration change of methylene blue) at a wavelength of 650 nm of the sample just after the preparation, the sample to which the visible light has been continuously applied for 7 hours, and the sample after the storage in a dark place are measured using a spectrophotometer "SP-300 (OPTIMA INC.)". ΔT1 and ΔT2 are determined from the following formulae.

ΔT1=(transmittance of sample to which visible light has been continuously applied for 7 hours)−(transmittance of sample just after preparation)

ΔT2=(transmittance of sample after storage in dark place)−(transmittance of sample just after preparation)

The degradability is evaluated on the basis of transmittance change ΔT=→T1-ΔT2. The evaluation criteria are as follows.

Evaluation Criteria of Degradability

A: 15%≤ΔT

B: 5%≤ΔT<15%

C: ΔT<5%

Dispersibility

The dispersibility is evaluated as follows. Into a beaker, 0.05 g of the particles obtained in each of Examples and Comparative Examples are inserted, and 1 g of methanol is added thereto to sufficiently wet the particles. Subsequently, 40 g of pure water is added thereto and then dispersion is performed with an ultrasonic disperser for 10 minutes. The particle size distribution of the resulting product is then measured with a Nanotrac UPA-ST (dynamic light scattering particle size analyzer manufactured by MicrotracBEL Corp.). The dispersibility is evaluated on the basis of the volumetric particle size distribution profile. The evaluation criteria are as follows.

Evaluation Criteria of Dispersibility

A: The volumetric particle size distribution has only one peak and the dispersibility is good.

B: The volumetric particle size distribution has two peaks, but the peak value of the principal peak is ten or more times larger than that of the other peak, which practically poses no problem in terms of dispersibility.

C: The volumetric particle size distribution has three or more peaks and the dispersibility is poor.

Tables 1 and 2 collectively show the details and evaluation results of Examples and Comparative Examples.

TABLE 1

| | Production conditions | | | | Characteristics |
|---|---|---|---|---|---|
| | Type of particle to be treated (particle without surface treatment) | Type of treatment agent | Amount of treatment agent added (mass %) | Heat treatment temperature (° C.) | Particle size D50v (nm) |
| Example 1 | A-TOP | hexyltrimethoxysilane | 35 | 400 | 12 |
| Example 2 | R-TOP | hexyltrimethoxysilane | 35 | 400 | 16 |
| Example 3 | Titanium oxide particle (sol-gel method) | hexyltrimethoxysilane | 35 | 400 | 120 |
| Example 4 | A-TOP | hexyltrimethoxysilane | 35 | 190 | 12 |
| Example 5 | A-TOP | hexyltrimethoxysilane | 35 | 350 | 12 |
| Example 6 | A-TOP | hexyltrimethoxysilane | 35 | 250 | 12 |
| Example 7 | A-TOP | hexyltrimethoxysilane | 35 | 500 | 12 |
| Example 8 | A-TOP | isobutyltrimethoxysilane | 35 | 400 | 12 |
| Example 9 | A-TOP | decyltrimethoxysilane | 35 | 400 | 12 |
| Example 10 | A-TOP | methyltrimethoxysilane | 35 | 400 | 12 |
| Example 11 | A-TOP | dodecyltrimethoxysilane | 35 | 400 | 12 |
| Example 12 | A-TOP | octadecyltrimethoxysilane | 35 | 400 | 12 |
| Example 13 | A-TOP | octyltrichlorosilane | 35 | 400 | 12 |
| Example 14 | A-TOP | 3-phenylaminopropyltrimethoxysilane | 20 | 400 | 12 |
| Example 15 | A-TOP | dimethoxy(methyl)(octyl)silane | 35 | 400 | 12 |
| Example 16 | A-TOP | tri-n-hexylchlorosilane | 35 | 400 | 12 |
| Example 17 | A-TOP | n-octyldimethylchlorosilane | 35 | 400 | 12 |
| Example 18 | A-TOP | hexamethyldisilazane | 35 | 400 | 12 |
| Example 19 | A-TOP | hexyltrimethoxysilane | 15 | 400 | 12 |
| Example 20 | A-TOP | hexyltrimethoxysilane | 95 | 400 | 14 |
| Example 21 | A-TOP | hexyltrimethoxysilane | 8 | 400 | 12 |
| Example 22 | A-TOP | hexyltrimethoxysilane | 110 | 400 | 15 |
| Example 23 | A-TOP | hexyltrimethoxysilane | 35 | 400 | 8 |
| Example 24 | A-TOP | hexyltrimethoxysilane | 35 | 400 | 1100 |

| | Characteristics | | | Evaluation | |
|---|---|---|---|---|---|
| | UV-Visi characteristics | | IR characteristics Wave number | | |
| | Absorbance at 450 nm | Absorbance at 750 nm | at absorption peak ($cm^{-1}$) | Degradability | Dispersibility |
| Example 1 | 0.62 | 0.28 | 2849/2917 | A | A |
| Example 2 | 0.51 | 0.15 | 2851/2919 | A | A |
| Example 3 | 0.45 | 0.17 | 2852/2920 | A | A |
| Example 4 | 0.22 | 0.08 | 2854/2926 | A | A |
| Example 5 | 0.34 | 0.11 | 2857/2928 | A | A |
| Example 6 | 0.46 | 0.15 | 2850/2919 | B | A |
| Example 7 | 0.52 | 0.24 | 2852/2922 | B | A |
| Example 8 | 0.41 | 0.22 | 2854/2924 | A | A |
| Example 9 | 0.47 | 0.28 | 2848/2922 | A | A |

TABLE 1-continued

| | | | | | |
|---|---|---|---|---|---|
| Example 10 | 0.36 | 0.14 | 2853/2920 | B | A |
| Example 11 | 0.38 | 0.12 | 2850/2921 | B | A |
| Example 12 | 0.47 | 0.25 | 2848/2925 | B | A |
| Example 13 | 0.45 | 0.23 | 2849/2920 | B | A |
| Example 14 | 0.48 | 0.20 | 2852/2921 | A | A |
| Example 15 | 0.41 | 0.18 | 2853/2918 | A | A |
| Example 16 | 0.50 | 0.15 | 2852/2921 | A | A |
| Example 17 | 0.46 | 0.17 | 2855/2917 | A | A |
| Example 18 | 0.41 | 0.12 | 2851/2919 | B | A |
| Example 19 | 0.34 | 0.10 | 2853/2920 | A | A |
| Example 20 | 0.35 | 0.08 | 2849/2921 | A | A |
| Example 21 | 0.22 | 0.05 | 2850/2918 | B | A |
| Example 22 | 0.35 | 0.11 | 2852/2923 | B | A |
| Example 23 | 0.35 | 0.10 | 2847/2922 | B | A |
| Example 24 | 0.38 | 0.13 | 2853/2925 | B | A |

A-TOP: anatase titanium oxide particle,
R-TOP: rutile titanium oxide particle

TABLE 2

| | Production conditions | | | | Characteristics | | | | Evaluation | |
|---|---|---|---|---|---|---|---|---|---|---|
| | Type of particle to be treated (particle without surface treatment) | Type of treatment agent | Amount of treatment agent added (mass %) | Heat treatment temperature (° C.) | Particle size D50v (nm) | UV-Visi characteristics Absorbance at 450 nm | UV-Visi characteristics Absorbance at 750 nm | IR characteristics Wave number at absorption peak ($cm^{-1}$) | Degradability | Dispersibility |
| Comparative Example 1 | A-TOP | — | — | — | 12 | — | — | absence | C | C |
| Comparative Example 2 | R-TOP | — | — | — | 16 | — | — | absence | C | C |
| Comparative Example 3 | A-TOP | — | — | 400 | 12 | — | — | absence | C | C |
| Comparative Example 4 | R-TOP | — | — | 400 | 16 | — | — | absence | C | C |
| Comparative Example 5 | Tungsten oxide particle | — | — | — | 200 | — | — | absence | B | C |
| Comparative Example 6 | A-TOP | hexyltrimethoxysilane | 35 | 600 | 12 | — | — | — | C | C |
| Comparative Example 7 | A-TOP | hexyltrimethoxysilane | 35 | 50 | 12 | — | — | 2849/2917 | C | A |

A-TOP: anatase titanium oxide particle,
R-TOP: rutile titanium oxide particle

As is clear from the above results, the degradability is better in Examples than in Comparative Examples. This indicates that the photocatalytic function in the visible range is better in Examples than in Comparative Examples. In Examples, good dispersibility is also achieved.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A titanium oxide particle surface-treated with a silane compound having a hydrocarbon group, wherein:

an amount of the silane compound with respect to the untreated titanium oxide particle is from 10 mass % to 35 mass %, a carbonization product of the hydrocarbon group, which is formed by heating the titanium oxide particle at 180° C. or higher and 500° C. or lower while or after surface treatment, is present inside pores of the titanium oxide particle, the titanium oxide particle has absorption at a wavelength of 400 nm or more and 800 nm or less in an ultraviolet-visible absorption spectrum, and the titanium oxide particle has an absorption peak at a wave number of 2700 $cm^{-1}$ or more and 3000 $cm^{-1}$ or less in an infrared absorption spectrum.

2. The titanium oxide particle according to claim 1, wherein the silane compound is a compound represented by general formula $R^1{}_nSiR^2{}_m$, where $R^1$ represents a saturated or unsaturated aliphatic hydrocarbon group having 1 to 20 carbon atoms or an aromatic hydrocarbon group, $R^2$ represents a halogen atom or an alkoxy group, n represents an integer of 1 to 3, and m represents an integer of 1 to 3, where n+m=4; when n represents an integer of 2 or 3, a plurality of $R^1$ represent the same group or different groups; and when m represents an integer of 2 or 3, a plurality of $R^2$ represent the same group or different groups.

3. The titanium oxide particle according to claim 2, wherein $R^1$ in the general formula $R^1{}_nSiR^2{}_m$ represents a saturated hydrocarbon group.

4. The titanium oxide particle according to claim 3, wherein $R^1$ in the general formula $R^1{}_nSiR^2{}_m$ represents a linear saturated hydrocarbon group.

5. The titanium oxide particle according to claim 2, wherein the alkoxy group has 1 to 10 carbon atoms.

6. The titanium oxide particle according to claim 2, wherein:

the titanium oxide particle has a volume-average particle size of 8 nm or more and 1.1 μm or less, and the titanium oxide particle is heated at 190° C. or higher and 500° C. or lower while or after the untreated titanium oxide particle is surface-treated.

7. The titanium oxide particle according to claim 2, wherein $R^1$ in the general formula $R^1{}_nSiR^2{}_m$ represents an aromatic hydrocarbon group having 6 to 27 carbon atoms.

8. The titanium oxide particle according to claim 7, wherein the aromatic hydrocarbon group is at least one selected from the group consisting of a phenylene group, a biphenylene group, a terphenylene group, a naphthalene group, and an anthracene group.

9. The titanium oxide particle according to claim 2, wherein the halogen atom is at least one selected from the group consisting of chlorine, bromine, and iodine.

10. The titanium oxide particle according to claim 1, wherein the titanium oxide particle has a volume-average particle size of 10 nm or more and 1 μm or less.

11. The titanium oxide particle according to claim 1, wherein the amount of the silane compound with respect to the untreated titanium oxide particle is from 10 mass % to 25 mass %.

12. A method for producing the titanium oxide particle according to claim 1, the method comprising:

surface-treating the untreated titanium oxide particle with the silane compound in an amount of from 10 mass % to 35 mass % with respect to the untreated titanium oxide particle, wherein the titanium oxide particle is heated at 180° C. or higher and 500° C. or lower while or after the untreated titanium oxide particle is surface-treated.

13. The method according to claim 12, wherein the silane compound is a compound represented by general formula $R^1{}_nSiR^2{}_m$, where $R^1$ represents a saturated or unsaturated aliphatic hydrocarbon group having 1 to 20 carbon atoms or an aromatic hydrocarbon group, $R^2$ represents a halogen atom or an alkoxy group, n represents an integer of 1 to 3, and m represents an integer of 1 to 3, where n+m=4; when n represents an integer of 2 or 3, a plurality of $R^1$ represent the same group or different groups; and when m represents an integer of 2 or 3, a plurality of $R^2$ represent the same group or different groups.

14. The method according to claim 13, wherein $R^1$ in the general formula $R^1{}_nSiR^2{}_m$ represents a saturated hydrocarbon group.

15. The method according to claim 14, wherein $R^1$ in the general formula $R^1{}_nSiR^2{}_m$ represents a linear saturated hydrocarbon group.

16. The method according to claim 13, wherein $R^1$ in the general formula $R^1{}_nSiR^2{}_m$ represents an aromatic hydrocarbon group having 6 to 27 carbon atoms.

17. The method according to claim 16, wherein the aromatic hydrocarbon group is at least one selected from the group consisting of a phenylene group, a biphenylene group, a terphenylene group, a naphthalene group, and an anthracene group.

18. The method according to claim 13, wherein the halogen atom is at least one selected from the group consisting of chlorine, bromine, and iodine.

19. The method according to claim 13, wherein the alkoxy group has 1 to 10 carbon atoms.

* * * * *